(12) United States Patent
Couckuyt et al.

(10) Patent No.: US 7,262,773 B2
(45) Date of Patent: *Aug. 28, 2007

(54) MULTIPLE CHART USER INTERFACE

(75) Inventors: Jeff Couckuyt, Bothell, WA (US); Paul Davies, Seattle, WA (US); Jason M. Cahill, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/060,116

(22) Filed: Feb. 17, 2005

(65) Prior Publication Data

US 2005/0232055 A1    Oct. 20, 2005

Related U.S. Application Data

(63) Continuation of application No. 09/794,847, filed on Feb. 27, 2001, now Pat. No. 6,906,717.

(51) Int. Cl.
*G06T 11/20* (2006.01)
*G06F 17/00* (2006.01)
*G06F 15/00* (2006.01)

(52) U.S. Cl. .................. 345/440; 715/769; 715/502

(58) Field of Classification Search ............... 345/440, 345/440.1, 440.2; 715/502, 769
See application file for complete search history.

(56) References Cited

U.S. PATENT DOCUMENTS

2002/0067358 A1* 6/2002 Casari et al. ............... 345/440

OTHER PUBLICATIONS

*Building extraordinary charts and graphs. Revisualize your vital data with Illustrator, FreeHand, and Photoshop*; J. Ashford; Macworld; (Oct. 1998) v. 15 n. 10, p. 107-109.
*Visualizing data*; P.L. Brooks; *DBMS* (Aug. 1997) v.10, n.9, p. 38-43, 45, 47.
*2-Dimensional transient heat conduction analysis using spreadsheets*; J.W. Baughn and M. Rossi; *Heat Transfer Engineering*, 1992, v.13, n.2 (Apr.-Jun.), p. 71-79.

* cited by examiner

*Primary Examiner*—Ryan Yang
(74) *Attorney, Agent, or Firm*—Merchant & Gould P.C.; Ryan T. Grace

(57) ABSTRACT

A drag-and-drop user interface (DDUI) can generate multiple charts in an integrated chart report and supports the drag-and-drop method of adding fields to the integrated chart report. When a field is dropped from a field list into a multiple chart drop zone, the DDUI will automatically generate additional charts to represent the data in the dropped field. An additional chart will be generated for each unique entry in a data field. The number of charts can be modified by selecting particular elements in the dropped field, by means of a drop-down menu. The drop-down menu enables the elimination or addition of elements of the dropped field. Each additional field dropped into the multiple chart drop zone will add a chart to the chart report. Conversely, each field dragged out of the multiple chart drop zone will eliminate a chart from the chart report. The DDUI can accommodate various chart types. The multiple chart drop zone can be slightly modified to accommodate the specialized needs of various chart types, for example, x-y, bubble, bar, and pie chart types.

24 Claims, 8 Drawing Sheets

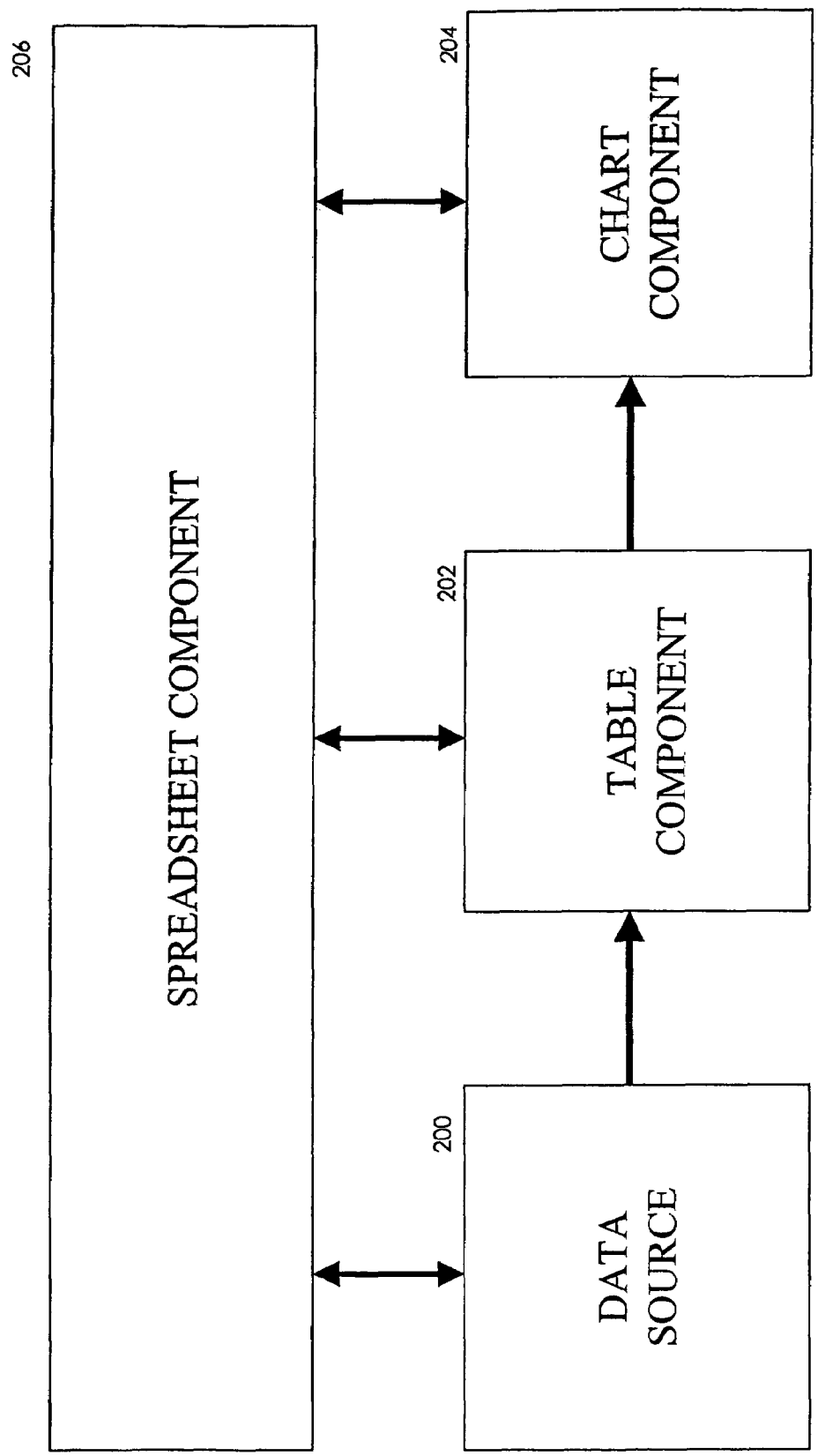

| | A | B | C | D | E | F | G | H |
|---|---|---|---|---|---|---|---|---|
| | Source data | | | | Pivot Table report | | | |
| 1 | Sport | Quarter | Sales | | | | | |
| 2 | Golf | Qtr3 | $1,500 | | | | | |
| 3 | Golf | Qtr4 | $2,000 | | Sum of Sales | Quarter | | |
| 4 | Tennis | Qtr3 | $600 | | Sport | Qtr3 | Qtr4 | Grand Total |
| 5 | Tennis | Qtr4 | $1,500 | | Golf | $7,930 | $2,000 | $9,930 |
| 6 | Tennis | Qtr3 | $4,070 | | Tennis | $4,670 | $6,500 | $11,170 |
| 7 | Tennis | Qtr4 | $5,000 | | Grand Total | $12,600 | $8,500 | $21,100 |
| 8 | Golf | Qtr3 | $6,430 | | | | | |

Source values for cell F5

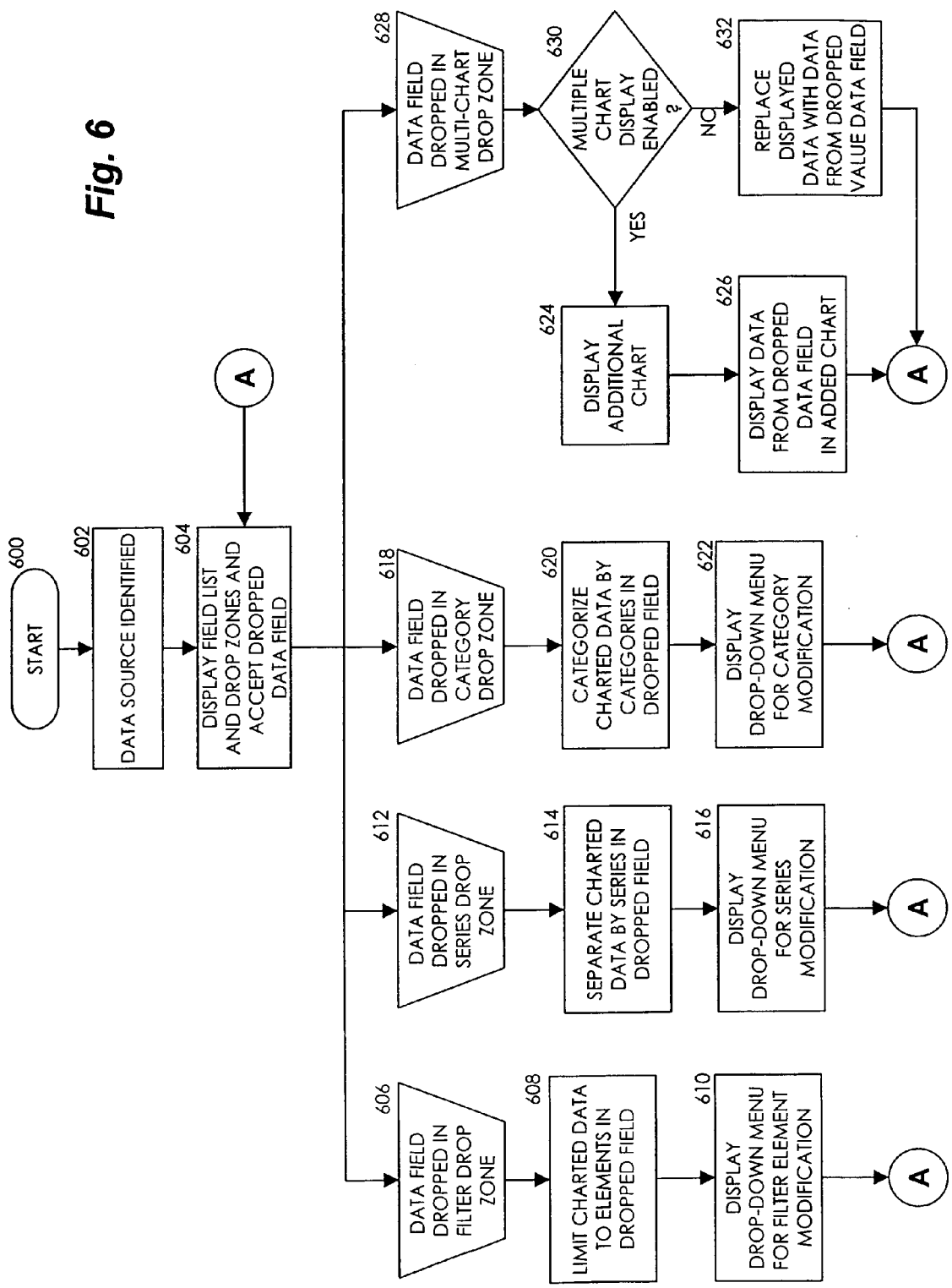

MULTIPLE CHART USER INTERFACE

CROSS-REFERENCE TO RELATED APPLICATIONS

This patent application is a continuation of U.S. patent application Ser. No. 09/794,847, entitled "Multiple Chart User Interface," filed on Feb. 27, 2001 now U.S. Pat. No. 6,906,717 and assigned to the same assignee as this application. The aforementioned patent application is expressly incorporated herein, in its entirety, by reference.

FIELD OF THE INVENTION

The present invention generally relates to providing a graphical data analysis tool to computer users. More particularly, the present invention relates to a user interface capable of generating multiple chart reports in an integrated data analysis tool.

BACKGROUND OF THE INVENTION

Modern spreadsheet application programs generally provide sophisticated charting tools for graphically representing data. One such charting tool provides a drag-and-drop user interface (DDUI) that permits a user to populate a chart with data from a data source (e.g., a multi-dimensional database). The primary benefit of the charting DDUI is that the user can quickly change the data that is being presented in the chart. For example, a user can drag-and-drop an icon representing the data field containing the sales of widgets in Washington. The data in the data field will be used to populate the portion of the charting DDUI into which the data field icon was dropped. The user may then replace the icon with another data field icon to generate a chart of the sales of widgets in Oregon. Thus, the charting DDUI enables quick comparisons between various data, without requiring a complicated set-up for identifying the data to be charted.

A data source can be represented as a field list that contains a group of field icons. Each field icon represents a field that can be used to populate the chart. The charting DDUI is divided into drop zones. Dropping a field icon into a drop zone causes the charting DDUI to populate a corresponding portion of the chart with the data from the field. The field list is divided into two field groups: a values group and a characteristics group. The values group contains fields of actual data values (e.g., sales totals) and the characteristics group contains fields of data characteristics (e.g., regions in which those sales totals were accumulated).

A conventional charting DDUI has four drop zones. A Data Field drop zone accepts data fields from the values group, such as a "Sales" data field. A Category Field drop zone accepts category fields from the characteristics group, such as the "Region" category field. A Series Field drop zone accepts series fields from the characteristics group, such as a "Product" category field. Finally, a Filter Field drop zone accepts filter fields from the characteristics group, such as a "Month" category field.

Thus, the above-described drop zones can be used to generate a customized graphical representation of data. For example, an x-y chart could be generated, with regions listed along the x-axis, sales totals listed along the y-axis, with lines across the chart representing sales levels for various products. The Filter field could be used to limit the data charted to the last five years.

A user can chart data (i.e., generate a chart report) and then change the data to compare scenarios by dropping a new data field icon into the DDUI. Unfortunately, conventional charting DDUIs do not provide the ability to compare different data scenarios on the same screen. For example, if a user wanted to chart the above data, but also wanted to generate separate charts for retail stores and wholesale stores, the charts would have to be generated in sequence. That is, the user would have to generate a retail store chart and then generate a wholesale store chart, but could not display both charts at the same time. Therefore, there is a need in the art for a charting DDUI that can generate multiple charts at the same time and supports the drag-and-drop method of adding fields.

SUMMARY OF THE INVENTION

The present invention meets the above-described needs by providing a charting DDUI that can generate multiple charts simultaneously in an integrated display and supports the drag-and-drop method of adding fields.

The present invention has a multiple data field drop zone that accepts multiple data fields to generate multiple charts. A chart can be any visual or graphical representation of data. When a user drops a field from the characteristics group into the multiple data field drop zone, the charting DDUI of the present invention will automatically generate additional charts to represent the data contained in the additional, dropped data field. An additional chart will be generated for each unique entry in the dropped data field. If a characteristics data field having multiple unique entries is dropped into the multiple data field drop zone, then an additional chart will be generated for each unique store type in the data field.

A user can modify the number of generated charts by modifying the number of represented elements in the data field. A drop-down menu is provided next to the data field name (in the multiple data field drop zone). The drop-down menu permits the elimination or addition of unique entries in the data field that are represented in the multiple data field drop zone. For example, if the dropped data field contains three unique entries, dropping the data field into the multiple data field drop zone would generate three, separate charts. However, by eliminating one of the unique entries, one of the charts can be eliminated.

In one aspect of the invention, a method is provided for generating a chart report. A field list is displayed containing at least one data field. A drop zone is displayed and receives a first data field that is dropped into the drop zone. In response to receiving the first data field, a first chart of the first data field is generated. The drop zone receives a second data field that is dropped into the drop zone and a second chart is generated of the first data field and a third chart is generated of the second data field In another aspect of the invention, a drag-and-drop user interface (DDUI) is provided for generating a chart report depicting data contained in a data source. The DDUI has a field list containing at least one value data field and at least one characteristic data field. The DDUI also has a data field drop zone for receiving at least one value data field, a filter field drop zone for receiving at least one characteristic data field, a category field drop zone for receiving at least one characteristic data field, a multiple chart drop zone for receiving at least one characteristic data field, and a series field drop zone for receiving at least one characteristic data field. The chart report having more than one chart is generated in response to receiving more than one characteristic data field in the multiple chart drop zone.

The various aspects of the present invention may be more clearly understood and appreciated from a review of the following detailed description of the disclosed embodiments and by reference to the drawings and claims.

BRIEF DESCRIPTION OF THE DRAWINGS

FIG. 2 is a block diagram illustrating some of the primary components of an exemplary embodiment of the present invention.

FIG. 3b depicts an exemplary table report and an associated data source.

FIG. 6 is a flow chart depicting an exemplary method for displaying multiple charts in a single, integrated chart report.

DETAILED DESCRIPTION

In an exemplary embodiment of the present invention, a drag-and-drop user interface (DDUI) is provided to generate multiple charts in an integrated chart report (i.e., all charts are simultaneously displayed) and to support the drag-and-drop method of adding data fields to the integrated chart report. A chart can be any visual or graphical representation of data. Typically, a data field is a group of data associated with a data source. Data values and characteristics can be represented as data fields in a field list. When a data field is dragged from a field list and dropped into a multiple data field drop zone, the DDUI of an exemplary embodiment can automatically generate additional charts to represent the data in the dropped data field. An additional chart will be generated for each unique entry in a data field. The number of charts can be modified by selecting particular elements in the dropped data field, by means of a drop-down menu. The drop-down menu permits the elimination or addition of elements of the dropped data field. Each additional data field dropped into the multiple data field drop zone will add one or more charts to the chart report. Conversely, each field dragged out of the value data field drop zone will eliminate one or more charts from the chart report.

An exemplary DDUI can accommodate various chart types. The multiple data field drop zone can be slightly modified to accommodate the specialized needs of various chart types, such as x-y, bubble, bar, and pie chart types.

Figure 1:
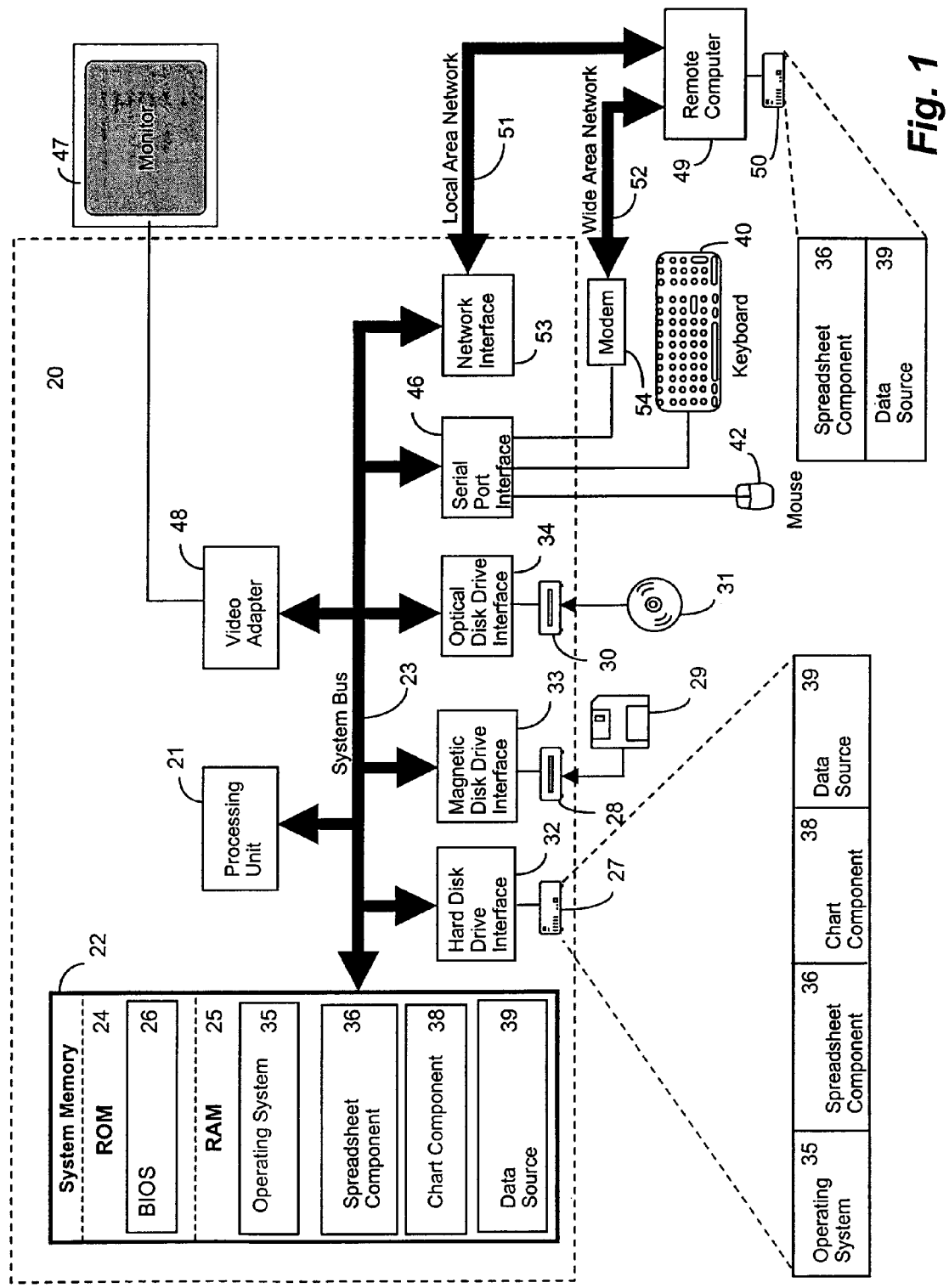
FIG. 1 is a block diagram illustrating an exemplary operating environment for implementing of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20.

A number of program modules may be stored on hard disk 27, magnetic disk 29, optical disk 31, ROM 24, or RAM 25, including an operating system 35, a spreadsheet component 36, a chart component 38, and a data source 39. Program modules include routines, sub-routines, programs, objects, components, data structures, etc., which perform particular tasks or implement particular abstract data types. Aspects of the present invention may be implemented in the form of a chart component 38 that can be incorporated into or otherwise in communication with a spreadsheet component 36. The spreadsheet component 36 generally comprises computer-executable instructions for creating or modifying an electronic spreadsheet document. The chart component 38 generally comprises computer-executable instructions for providing a chart report or other graphical data analysis tools, based on data contained in the data source 39. The chart component 38 is generally accessible to the spreadsheet component 36, but can also be implemented as an integral part of the spreadsheet editor program module. As is described in connection with FIG. 2, the chart component 38 can also be implemented in conjunction with a table component (element 202 of FIG. 2), either as separate components or as a single, integrated component.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

FIG. 2 depicts an exemplary chart component 204 operating in conjunction with an exemplary spreadsheet component 206. The chart component 204 can be any program module operative to graphically render charts or graphs or any other graphical display of data. The rendered data can come from a data source 200 and/or a spreadsheet component 206. An exemplary spreadsheet component can retrieve data from and store data to the data source 200. The data source 200 can be a spreadsheet document, a database, or any other well-known means for data compilation. Those skilled in the art will appreciate that either flat data (i.e., one or two dimensional data) or multi-dimensional data (more than two-dimensional data) can be processed by the spreadsheet component 206.

The spreadsheet component 206 can access the chart component 204 to provide a graphical representation of data. Often, the spreadsheet component will also access a table component 202. The table component 202 is a program module operative to organize data into tables to enhance the ability of the spreadsheet component 206 to manipulate the data. The Pivot Table component of the Microsoft Excel spreadsheet application program, marketed and manufactured by Microsoft Corporation of Redmond, Wash., is an example of a table component. The exemplary table component 202 can be used to create an interactive table that summarizes data from the data source 200. The rows and columns of the interactive table can be rotated to produce various summaries of the data, to filter the data by displaying selected parts of the data, and to display the data in a particular area of interest. Such interactive table components are well known to those of ordinary skill in the art.

The chart component 204 can be used in conjunction with the interactive table component 202 to view and rearrange data graphically. In an exemplary embodiment of the present invention, the chart component produces a chart report that is associated with a table component report and includes all of the data in the associated table component report. The Pivot chart component of the Microsoft Excel spreadsheet application program is an example of an exemplary chart component.

Figure 3A:
FIG. 3a depicts an exemplary data source.
Figure 3C:
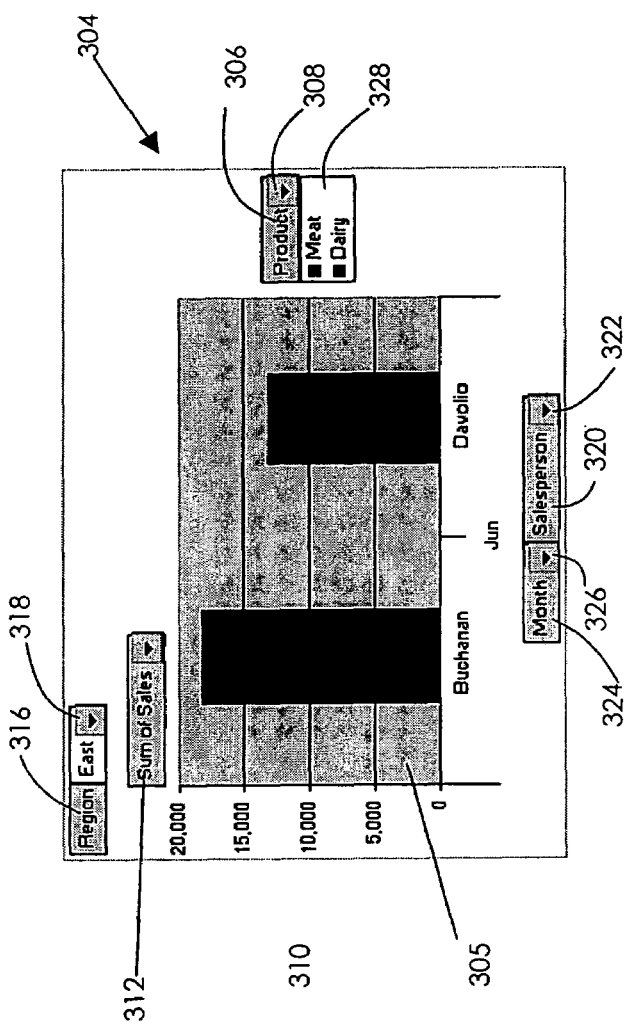
FIG. 3c depicts an exemplary chart report.

FIGS. 3a-3c depict exemplary table reports and chart reports representing data contained in exemplary data sources. FIG. 3a depicts an exemplary data source 300 that is a flat data source, maintained in a two-dimensional spreadsheet document. The data source 300 includes data fields for "Month", "Product", "Salesperson", "Sales", and "Region" data. Each data field is either a value data field or a characteristics data field. In the example of FIG. 3a, the "Sales" data field is a value data field and the other data fields are characteristics data fields. FIG. 3b depicts an exemplary table report 302 in connection with the associated source data 303. The table report shows a rotated "Quarter" column that is used to categorize sales totals by yearly quarter. That is, the raw data is processed from the source data 303 to collect and total the sales data by quarter. Additionally, the "Sport" column has been condensed to total the sales data for "Golf" and "Tennis" entries. Thus, for example, the sales value in cell F5 of the table report 302 sums all sales data for golf-related sales occurring in the third quarter. The sales values meeting the criteria are contained in cells C2 and C8 of the data source 303.

FIG. 3c depicts an exemplary chart report. The chart report 304 has been generated from the data source 300 of FIG. 3a. In the chart report 304, a bar graph 305 is generated that categorizes the sales figures from the data source 300 by Salesperson and Month. The Month data field and the Salesperson data field are referred to as categories. In FIG. 3c, the categories are shown as category buttons 320 and 324. The Month category button 324 has an associated drop-down menu (not shown) that can be accessed with toggle button 326. The drop-down menu enables the modification of elements of the Month data field. For example, the month of June can be selected and the month of May de-selected by use of the drop-down menu to provide the bar graph 305 showing only sales totals for the month of June. On the other hand, the drop-down menu associated with Salesperson category button 320 has not been used to modify the elements of the Salesperson data field. Accordingly, all elements of the Salesperson data field (i.e., Buchanan and Davolio) are shown in the bar graph 305.

The data to be charted is identified by value data field button 312. In the example of FIG. 3c, the data to be charted are the sales figures from the "Sales" column of the data source 300 (FIG. 3a). The data depicted in the bar graph 305 can be further filtered by use of a filter button 316. The filter button can be used to limit the data that is depicted in the bar graph 305 by providing a drop-down menu accessible though toggle button 318. The drop-down menu will display the unique elements of one or more data fields. By selecting and de-selecting unique elements of the data field, the chart report 304 can be customized to focus on a particular collection of data. In the example of FIG. 3c, the "Region" data field has been used to filter the bar graph 305. The data field element "East" has been selected from the drop-down menu. As a result, only the sales totals corresponding to the East region are depicted in the bar graph 305.

The exemplary chart report 304 can also include a series button 306 that permits the separation of charted data into particular series. In the example of FIG. 3c, the sales data has been divided into "Meat" and "Dairy" product types. Accordingly, the bar-type representations of sales totals are charted in two shades, each shade corresponding to a charted series. The series can be selected by use of a drop-down menu that can be displayed by and accessed through toggle button 308. A coded legend 328 can also be automatically generated to provide a means for identifying the series depicted in the chart report 304.

The description of FIGS. 3a, 3b, and 3c is intended to provide a basic understanding of the interaction between a data source, a table report, and a chart report, a more detailed description of table reports can be found in a co-pending U.S. patent application Ser. No. 09/332,720, that is also assigned to Microsoft Corporation of Redmond, Wash. A more detailed description of chart reports can be found in co-pending U.S. patent application Ser. No. 09/333,737, also assigned to Microsoft Corporation of Redmond, Wash. Both of these patent applications are hereby incorporated by reference.

Figure 4:
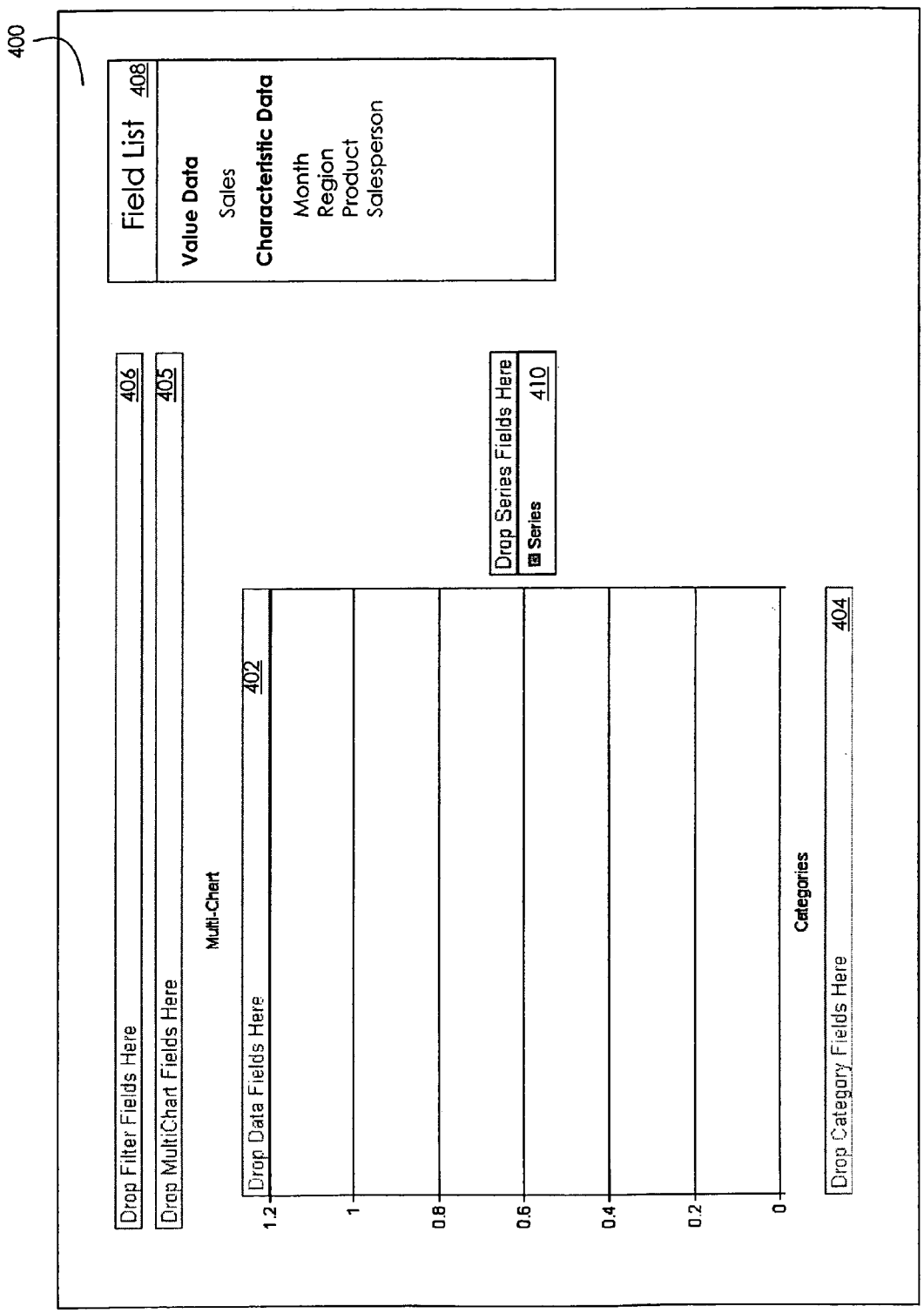
FIG. 4 depicts an exemplary drag-and-drop user interface, operative to generate a chart report.

FIG. 4 depicts an exemplary drag-and-drop user interface (DDUI) for generating a chart report having a single chart. The DDUI 400 can be associated with a data source, such as the two dimensional data source 300 of FIG. 3a. Once associated with a data source, the DDUI can automatically generate a field list 408 that includes both value data and characteristic data. Value data includes data, such as sales data, that can be summarized and compiled (i.e., aggregated), in a graphical format. In the example of FIG. 4, the sales data from the data source 300 is the value data provided in the field list 408. Characteristic data includes characteristics of the value data. The characteristics permit the value data to be manipulated (e.g., summarized, filtered) in a graphical format.

The DDUI 400 permits the value data fields and the characteristic data fields (collectively, data fields) to be dragged and dropped into drop zones. A Data Field drop zone 402 can accept value data fields (e.g., sales) and will chart that data as described in connection with FIGS. 3a-3c. Category drop zone 404 will accept characteristic data fields and will modify the charted data as described above in connection with FIGS. 3a-3c. A. Multi-Chart drop zone 405 can accept characteristic data fields and will modify the charted data as described above in connection with the Category drop zone 404. A series drop zone 410 accepts characteristic data field and will separate the charted data as described above in connection with FIGS. 3a-3c. Finally, a filter drop zone 406 accepts characteristic data fields and filters the charted data as described above in connection with FIGS. 3a-3c.

Although the Multi-Chart drop zone 405 and the Category drop zone 404 both accept dropped characteristic data fields, the Multi-Chart drop zone and the Category drop zone differ in at least one significant way. If a user drops a characteristic data field in a Category drop zone 404 that is already populated, then the newly dropped characteristic data field will replace the previously dropped characteristic data field populating the Category drop zone. However, dropping a characteristic data field in the Multi-Chart drop zone 405 will add the effects of the newly dropped characteristic data field to any characteristic data fields previously dropped in the Multi-Chart drop zone 405. Notably, dropping an additional characteristic data field into the Multi-Chart drop zone 405 will create at least one new chart. This multiple chart feature provides a user interface that permits a user to quickly compare the effects of multiple characteristic data fields on charted data.

The DDUI 400 provides an excellent tool for generating multiple chart reports quickly. Moreover, the DDUI 400 permits the generated chart reports to be modified quickly and easily. The DDUI 400 allows a chart report to be quickly populated and de-populated by dragging and dropping data fields into or out of drop zones.

Figure 5:
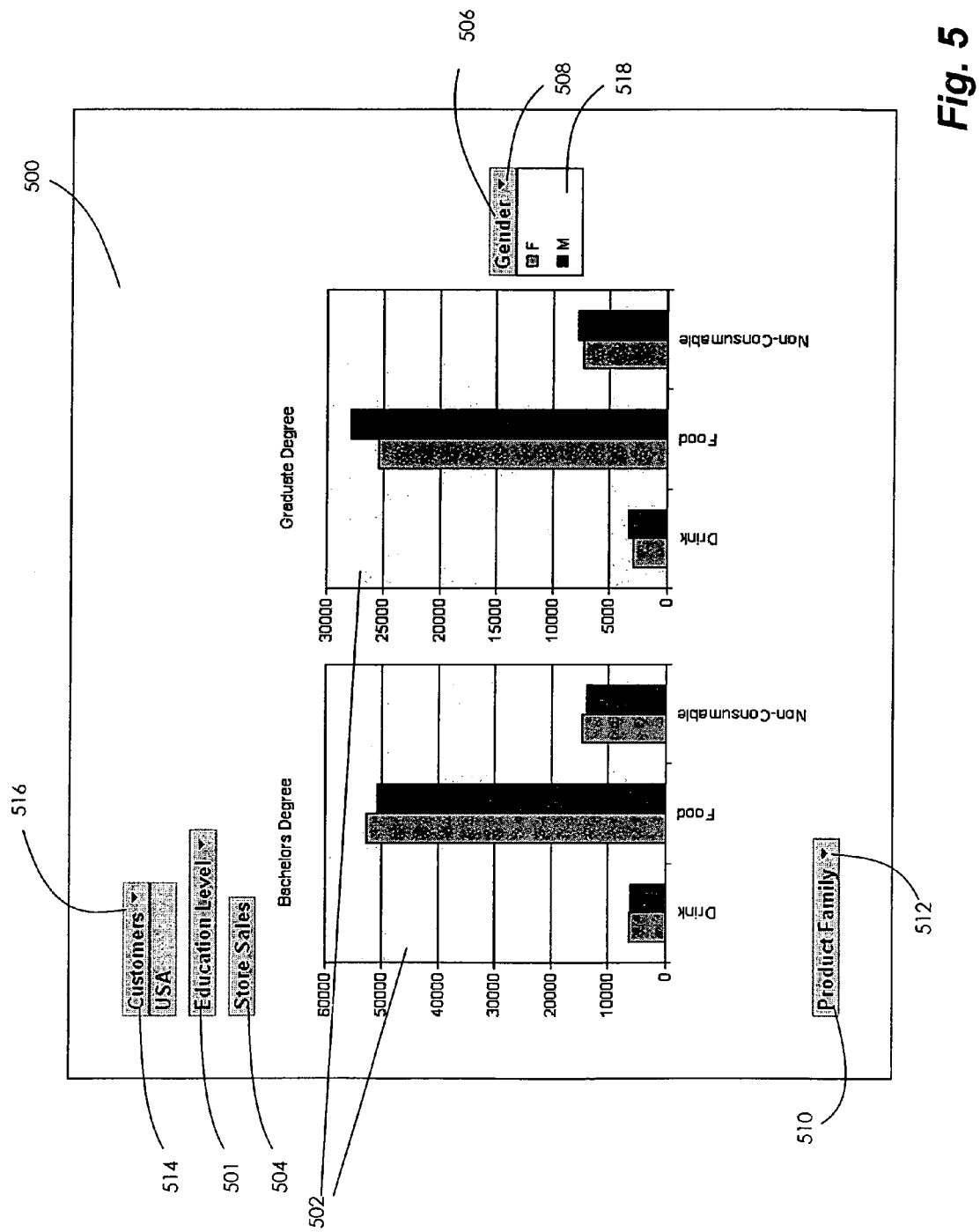
FIG. 5 depicts an exemplary drag-and-drop user interface, operative to generate a chart report capable of displaying multiple charts.

FIG. 5 depicts an exemplary drag-and-drop user interface (DDUI) for generating a chart report integrating multiple sub-charts. The DDUI 500 of FIG. 5 has been populated (unlike the DDUI 400 of FIG. 4). The DDUI 500 permits multiple characteristic data fields to be dropped into a Multi-Chart drop zone 501. Each dropped data field will generate a new sub-chart 502 for each sub-data field in the dropped data field.

In the example depicted in FIG. 5, an "Education Level" data field has been dropped into the Multi-Chart drop zone 501. The Education Level data field is divided into two sub-data fields. Each sub-data field generates a corresponding sub-chart 502. In this example, the sub-data fields are "Bachelors Degree" and "Graduate Degree". Each sub-chart 502 is divided by "Store Sales" in the y-axis and by "Product Family" in the x-axis. The Product Family data field has been dropped into the category drop zone as indicated by category field button 510. The specific elements of the Product Family that will affect the sub-charts 502 (e.g., Drink, Food, Non-Consumable) can be selected by use of a drop-down menu accessible through toggle button 512.

A "Customers" data field has been dropped into the filter drop zone as indicated by filter button 514. As described above in connection with FIGS. 3a-3c, the unique elements of the Customers data field can be selected by use of a drop-down menu accessible through toggle button 516. In this example, the filter button 514 indicates that Customers in the "USA" are being displayed. That is, all non-USA elements of the Customers data field are being filtered (i.e., eliminated from the sub-charts).

Finally, a series drop zone includes a "Gender" data field, as indicated by series button 506. The Gender data field includes the unique entries shown in the legend 518. As a result, each sub-chart 502 is separated into the series elements (i.e., Male, Female) shown in the legend 518. As described above in connection with FIGS. 3a-3c, the unique elements of the Gender data field can be selected and de-selected using a drop-down menu accessible through toggle button 508.

Advantageously, the multiple chart data field drop zone of DDUI 500 permits the comparison of data in an integrated display. For the purposes of this description, an integrated display depicts all generated sub-charts simultaneously. Accordingly, each sub-chart 502 can be displayed and modified to provide instant graphical data analysis. In the case of conventional chart report tools, each chart must be individually generated. This limitation presents an obstacle to the ability to compare graphical representations of data. For example, with a conventional chart report tool, a user could generate a series of charts and print each chart report, so that the printed chart reports could be compared to one another. However, the integrated DDUI 500 of FIG. 5 permits the comparison of multiple charts in an integrated display, thereby enhancing the ability to perform comparative data analysis. In an exemplary embodiment of the present invention, the chart component can be configured to permit or prohibit the display of multiple charts. Multiple chart functionality can be governed through the use of well-known options and/or preferences configuration tools.

FIG. 6 depicts an exemplary method for generating a chart report with one or more charts. The method starts at block 600 and proceeds to step 602. At step 602 a data source is identified. As described above, an exemplary chart report can be populated with data from a data source. The method proceeds from step 602 to step 604 and the field list and drop zones are displayed. Once the field list and drop zones have been displayed, the method can accept dropped data fields. The dropped fields can be any of the fields listed in event blocks 606, 612, 618, and 628, as well as various other fields, not depicted in FIG. 6.

If a data field is dropped in the filter drop zone, the method branches to event block 606 and then to step 608. At step 608, the charted data is limited to elements identified in the dropped data field. The method then proceeds to step 610. At step 610, a drop-down menu is displayed permitting modification of the filter elements in the data field. As described above, this step can be performed in response to a toggle button selection. The method then proceeds to step 604, via connectors A. At step 604, the field list and drop zones can be refreshed, as required, and the method can receive further dropped data fields.

If a data field is dropped in the series drop zone, the method branches from step 604 to event block 612 and then to step 614. At step 614, the charted data is separated according to the series in the dropped field. The method then proceeds to step 616 and a drop-down menu is displayed to modify the series elements of the dropped field. As described above, this step can be performed in response to a toggle button selection. The method then proceeds to step 604, via connectors A.

If a data field is dropped in the category drop zone, the method branches from step 604 to event block 618 and then to step 620. At step 620, the charted data (e.g., the data in each sub-chart) is categorized according to the categories in the dropped category field. The method then proceeds to step 622 and a drop-down menu can be displayed for modifying the category elements of dropped data field. As described above, this step can be performed in response to a toggle button selection. The method then proceeds to step 604, via connectors A.

If a data field is dropped in the multi-chart drop zone, then the method branches from step 604 to event block 628. The method then proceeds to decision block 630, wherein a determination is made as to whether the multiple chart display has been enabled. As described above in connection with FIG. 5, the display of multiple sub-charts in an integrated chart report can be enabled and disabled. If the multiple chart display has been enabled, then the method branches to step 624 and an additional chart can be displayed, if necessary, to chart the additional data provided in the dropped data field. The method proceeds from step 624 to step 626. At step 626, the data from the dropped value data field is displayed in the added chart. The method then proceeds to step 604, via connectors A.

Returning now to decision block 630, if a determination is made that the multiple chart display has been disabled, then the method branches to step 632. At step 632, the data that is displayed in the chart report will be replaced with the data from the dropped value data field. Accordingly, only the data from the dropped data field will be graphically represented in the chart report. The method then proceeds to step 604, via connectors A. Notably, although not depicted in FIG. 6, a drop-down menu can be displayed to permit the modification of the elements of the dropped value data field, following steps 626 and 632.

Advantageously, the method of FIG. 6 can generate and display a chart report having one or more charts and/or sub-charts in an integrated display (e.g., within the same window). Although no limit has been defined by the method, those skilled in the art will appreciate that the number of charts that can be displayed will be limited by the capabilities of the display device. That is, at some point, each sub-chart will be reduced in size so significantly to permit the display of multiple sub-charts that each sub-chart will be too small to be meaningfully used as an analysis tool.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for generating a chart report depicting data contained in a data source utilizing a drag-and-drop user interface, comprising:
    providing a field list containing at least one value data field and at least one characteristic data field;
    receiving the at least one value data field in a data field drop zone;
    receiving the at least one characteristic data field in a filter field drop zone;
    receiving the at least one characteristic data field in a category field drop zone;
    receiving the at least one characteristic data field in a multiple chart drop zone; and
    receiving the at least one characteristic data field in a series field drop zone;
    wherein the chart report is generated with more than one chart, in response to receiving more than one characteristic data field in the multiple chart drop zone and wherein each chart is displayed in a separate graph and shares no common axis with another chart.

2. The method of claim 1 further comprising limiting the data in the chart report to at least one element identified in the dropped characteristic data field.

3. The method of claim 1 further comprising separating the data in the chart report according to at least one series in the dropped characteristic data field.

4. The method of claim 1 further comprising categorizing the data in the chart report according to at least one category in the dropped characteristic data field.

5. The method of claim 1 further comprising displaying the more than one chart simultaneously.

6. The method of claim 1 further comprising displaying the more than one chart in a single window.

7. The method of claim 1 further comprising populating the chart report by dragging and dropping at least one data field into a drop zone.

8. The method of claim 1 further comprising de-populating the chart report by dragging and dropping at least one data field out of a drop zone.

9. A computer-readable medium having stored thereon computer-executable instructions which, when executed on a computer, perform a method for generating a chart report depicting data contained in a data source utilizing a drag-and-drop user interface, the method comprising:
    providing a field list containing at least one value data field and at least one characteristic data field;
    receiving the at least one value data field in a data field drop zone;
    receiving the at least one characteristic data field in a filter field drop zone;

receiving the at least one characteristic data field in a category field drop zone;

receiving the at least one characteristic data field in a multiple chart drop zone; and receiving the at least one characteristic data field a series field drop zone;

wherein the chart report is generated with more than one chart, in response to receiving more than one characteristic data field in the multiple chart drop zone and wherein each chart is displayed in a separate graph and shares no common axis with another chart.

10. The computer-readable medium of claim 9 further comprising limiting the data in the chart report to at least one element identified in the dropped characteristic data field.

11. The computer-readable medium of claim 9 further comprising separating the data in the chart report according to at least one series in the dropped characteristic data field.

12. The computer-readable medium of claim 9 further comprising
categorizing the data in the chart report according to at least one category in the dropped characteristic data field.

13. The computer-readable medium of claim 9 further comprising displaying the more than one chart simultaneously.

14. The computer-readable medium of claim 9 further comprising displaying the more than one chart in a single window.

15. The computer-readable medium of claim 9 further comprising
populating the chart report by dragging and dropping at least one data field into a drop zone.

16. The computer-readable medium of claim 9 further comprising de-populating
the chart report by dragging and dropping at least one data field out of a drop zone.

17. A system for generating a chart report depicting data contained in a data source utilizing a drag-and-drop user interface, the system comprising:

a processor, a memory having computer-executable instructions stored thereon, wherein the computer-executable instructions are configured to:

provide a field list containing at least one value data field and at least one characteristic data field;

receive the at least one value data field in a data field drop zone;

receive the at least one characteristic data field in a filter field drop zone;

receive the at least one characteristic data field in a category field drop zone;

receive the at least one characteristic data field in a multiple chart drop zone; and receive the at least one characteristic data field a series field drop zone;

wherein the chart report is generated with more than one chart, in response to receiving more than one characteristic data field in the multiple chart drop zone and wherein each chart is displayed in a separate graph and shares no common axis with another chart.

18. The system of claim 17 further comprising the computer-executable instructions being configured to limit the data in the chart report to at least one element identified in the dropped characteristic data field.

19. The system of claim 17 further comprising the computer-executable instructions being configured to separate the data in the chart report according to at least one series in the dropped characteristic data field.

20. The system of claim 17 further comprising the computer-executable instructions being configured to categorize the data in the chart report according to at least one category in the dropped characteristic data field.

21. The system of claim 17 further comprising the computer-executable instructions being configured to display the more than one chart simultaneously.

22. The system of claim 17 further comprising the computer-executable instructions being configured to display the more than one chart in a single window.

23. The system of claim 17 further comprising the computer-executable instructions being configured to populate the chart report by dragging and dropping at least one data field into a drop zone.

24. The system of claim 17 further comprising the computer-executable instructions being configured to de-populate the chart report by dragging and dropping at least one data field out of a drop zone.

* * * * *